(12) United States Patent
Nakata et al.

(10) Patent No.: US 8,202,813 B2
(45) Date of Patent: Jun. 19, 2012

(54) OPTICAL MATERIAL AND OPTICAL ELEMENT

(75) Inventors: Kohei Nakata, Utsunomiya (JP); Michio Endo, Utsunomiya (JP); Kentaro Doguchi, Utsunomiya (JP); Shigeru Fujino, Kasuga (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/363,492

(22) Filed: Feb. 1, 2012

(65) Prior Publication Data

US 2012/0126437 A1   May 24, 2012

Related U.S. Application Data

(62) Division of application No. 12/551,822, filed on Sep. 1, 2009.

(30) Foreign Application Priority Data

Sep. 30, 2008   (JP) .................................. 2008-255080

(51) Int. Cl.
C04B 35/50   (2006.01)
(52) U.S. Cl. ......... 501/152; 501/153; 264/603; 264/674
(58) Field of Classification Search ................ 501/152, 501/153; 264/603, 674
See application file for complete search history.

(56) References Cited

U.S. PATENT DOCUMENTS

| | | | |
|---|---|---|---|
| 4,971,423 A | 11/1990 | Nakata et al. | |
| 5,032,000 A | 7/1991 | Shingaki et al. | |
| 5,204,779 A | 4/1993 | Nakata et al. | |
| 6,326,076 B1 | 12/2001 | Takai | |
| 7,022,262 B2 | 4/2006 | Lee et al. | |
| 7,324,285 B2 | 1/2008 | Reichel et al. | |
| 7,427,577 B2 | 9/2008 | Tang et al. | |
| 2003/0078156 A1 | 4/2003 | Lowden et al. | |
| 2004/0109808 A1 | 6/2004 | Lee et al. | |
| 2005/0215419 A1 | 9/2005 | Takagimi et al. | |
| 2007/0238604 A1 | 10/2007 | Tang et al. | |
| 2008/0108496 A1 | 5/2008 | Gratson et al. | |
| 2008/0122362 A1 | 5/2008 | Gratson et al. | |
| 2010/0294939 A1 | 11/2010 | Kuntz et al. | |
| 2011/0034319 A1 | 2/2011 | Villalobos et al. | |

FOREIGN PATENT DOCUMENTS

| | | |
|---|---|---|
| CN | 101097262 A | 1/2008 |
| JP | 06-056514 A | 3/1994 |
| JP | 2008-001556 A | 1/2008 |

OTHER PUBLICATIONS

Jun. 8, 2011 Chinese Official Action in Chinese Patent Appln. No. 200910177630.5.

*Primary Examiner* — Karl Group
(74) *Attorney, Agent, or Firm* — Fitzpatrick, Cella, Harper & Scinto

(57) ABSTRACT

An optical element is formed by vacuum-sintering a molded body of ceramic particles having an average particle diameter of 1 μm or more and 10 μm or less and including $Ln_xAl_yO_{[x+y]\times1.5}$ (Ln represents a rare-earth element, $1 \leq x \leq 10$, and $1 \leq y \leq 5$). Ln preferably includes at least one kind selected from La, Gd, Yb, and Lu. The optical element preferably has a refractive index of 1.85 or more and 2.06 or less, and an Abbe number of 48 or more and 65 or less. The obtained optical element has optical properties of high refractive index and low dispersibility.

2 Claims, 1 Drawing Sheet

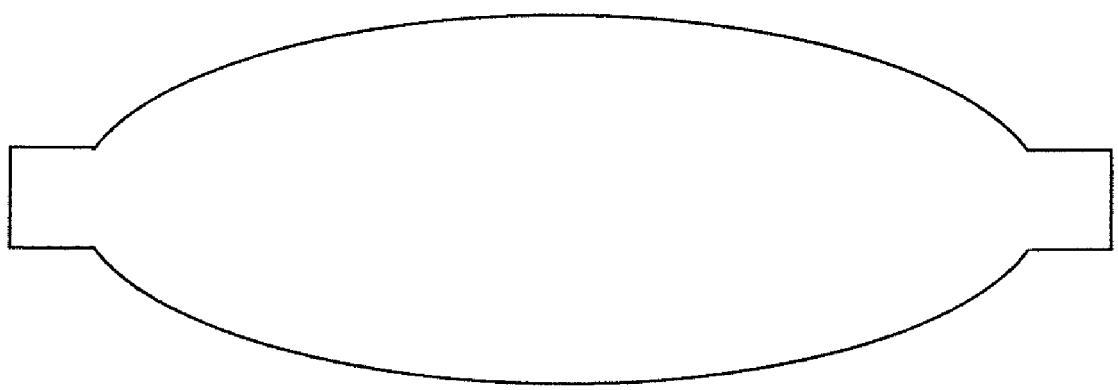

OPTICAL MATERIAL AND OPTICAL ELEMENT

This application is a division of application Ser. No. 12/551,822 filed Sep. 1, 2009.

BACKGROUND OF THE INVENTION

1. Field of the Invention

The present invention relates to an optical element, in particular, a highly accurate optical element used for a lens or the like.

2. Description of the Related Art

In recent years, the production of cameras including digital cameras has been increasing, and hence, there have been demanded optical lenses having higher performance. In particular, for enhancing the optical performance of a camera or the like, there is required an optical material having high refractive index and low dispersibility.

The high refractive index and low dispersibility, which are absent in the conventional optical glass, can be realized by using a crystal material, and in order to use the crystal material as a material which has a good transmittance and is suitable for optical applications, there has been a method involving using a single-crystal material or a method involving sintering crystal particles and using the resultant.

On the other hand, there have been problems that the single-crystal material is extremely expensive, and it is difficult to obtain a material which has a large diameter and is suitable for an optical lens. That is, in the method involving sintering crystal particles, when the particle diameter is large, a large grain boundary occurs during sintering to cause decrease in a transmittance as an optical lens, and a defect occurs on a lens surface due to a grain boundary at the time of processing the material into a lens shape, and hence, it has been difficult to obtain a good optical lens.

In Japanese Patent Application Laid-Open No. H06-056514, there is disclosed, as crystal particles each having a small particle diameter, an example of light transmissive ceramics having a crystal particle diameter of 100 nm or less. However, in the process of sintering crystal particles each having a diameter of 100 nm or less, the handling thereof was extremely difficult due to the small bulk density at the time of forming a preliminary molded body before sintering. On the other hand, of the ceramics having optical properties of high refractive index and low dispersibility, there are many substances which have high sintering temperature and are hence accompanied by difficulties during the process of sintering.

SUMMARY OF THE INVENTION

The present invention has been accomplished in view of the problems of the above-mentioned related art, and it is, therefore, an object of the present invention to provide an optical element having optical properties of high refractive index and low dispersibility.

A first optical element for solving the above-mentioned problems is formed by vacuum-sintering a molded body of ceramic particles having an average particle diameter of 1 μm or more and 10 μm or less and comprising $Ln_xAl_yO_{[x+y]\times1.5}$ (Ln represents a rare-earth element, x represents $1\leq x\leq 10$, and y represents $1\leq y\leq 5$).

A second optical element for solving the above-mentioned problems is formed by vacuum-sintering a molded body of particles having a two-layer structure, the particles being formed by coating, on surfaces of ceramic particles having an average particle diameter of 1 μm or more and 10 μm or less and comprising $Ln_xAl_yO_{[x+y]\times1.5}$ (Ln represents a rare-earth element, x represents $1\leq x\leq 10$, and y represents $1\leq y\leq 5$), a coating layer comprising a ceramic having a lower sintering temperature than a sintering temperature of the ceramic particles.

Further features of the present invention will become apparent from the following description of exemplary embodiments with reference to the attached drawing.

BRIEF DESCRIPTION OF THE DRAWING

The FIGURE is a cross-sectional view illustrating an optical element according to the present invention.

DESCRIPTION OF THE INVENTION

The optical element of the present invention is formed by vacuum-sintering, by using specific ceramic particles, crystal particles at a lower temperature than a temperature during an ordinary sintering process, and has optical properties of high refractive index and low dispersibility without any defects. The optical element of the present invention can be applied to a lens and a prism used for various optical systems.

(First Embodiment)

An optical element according to Example 1 of the present invention is formed by vacuum-sintering a molded body of ceramic particles having an average particle diameter of 1 μm or more and 10 μm or less and including $Ln_xAl_yO_{[x+y]\times1.5}$ (Ln represents a rare-earth element, x represents $1\leq x\leq 10$, and y represents $1\leq y\leq 5$).

The above Ln includes rare-earth elements, and specific examples thereof include Y, La, Ce, Pr, Nd, Pm, Sm, Eu, Gd, Tb, Dy, Ho, Er, Tm, Yb, and Lu. Of those rare-earth elements, it is particularly preferred that Ln be at least one kind or more selected from La, Gd, Yb, and Lu.

Furthermore, the average particle diameter of the ceramic particles is desirably 1 μm or more and 10 μm or less. When the average particle diameter is less than 1 μm, the particles are too fine and partial agglomeration occurs, and hence, it is difficult to sufficiently densify the particles at the time of pressurizing, and the optical element after sintering has remaining bubbles, and hence, the resultant element is unsuitable to be used as an optical element. When the average particle diameter exceeds 10 μm, a void is easily formed at the time of pressurizing and a grain boundary easily occurs in the crystal obtained after sintering, and hence, detachment of the particles occurs during polishing, so that an optical element having a satisfactory surface cannot be obtained.

The shape of the ceramic particle is preferably spherical. As the particle changes from a spherical shape to an irregular shape, a void is more easily formed at the time of pressurizing and a grain boundary more easily occurs in the crystal obtained after sintering, and hence, a satisfactory optical element cannot be obtained. Incidentally, the spherical shape preferably has the following relationship: longitudinal diameter of cross-sectional shape of sphere/transverse diameter of cross-sectional shape of sphere=1±0.1. Furthermore, the optical element preferably has a refractive index of 1.8 or more and has transmissivity.

A method of producing the optical element of the present invention is as follows. First, spherical ceramic particles having an average particle diameter of 1 μm or more and 10 μm or less are prepared by a method such as plasma melting. Next, the spherical ceramic particles are subjected to casting, dry molding, or wet molding to thereby prepare a preliminary molded body. Furthermore, the preliminary molded body is sintered under a vacuum, followed by grinding and polishing processes, and as a result, an optical element for an optical lens or the like is obtained.

When the molded body of ceramic particles is vacuum-sintered, air bubbles present in the voids between the ceramic particles can be removed and the quality of the optical element can be maintained, and hence, the optical element is a preferred mode. In particular, in the present invention, crystal particles are vacuum-sintered at a lower temperature than the temperature during an ordinary sintering process, and hence, an optical element having optical properties of high refractive index and low dispersibility without any defects can be obtained. The degree of vacuum in vacuum-sintering is preferably 0.1 Pa or less.

EXAMPLE 1

First, $La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed ceramic particles having the compounds shown in Sample Nos. 1 to 8 in Table 1, and the oxide raw materials were mixed.

The raw materials were introduced into thermal plasma, and were heated and melted, followed by cooling, by a thermal plasma method for obtaining fine particles, and as a result, spherical particles having an average particle diameter of 1 μm were obtained. At that time, the heating temperature was set at 1,500° C. or higher and 3,200° C. or lower. When the heating temperature was lower than 1,500° C., the melting was not performed sufficiently and the spherical particles were not obtained. When the heating temperature exceeded 3,200° C., the volatilization of the raw materials occurred, and there were obtained only the particles in spherical shape each having a small particle diameter.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at a temperature range of 1,100° C. or higher and 1,500° C. or lower shown in the table below under a vacuum of $10^{-1}$ Pa or lower. Incidentally, the time taken for sintering was set to 6 hours or more and 24 hours or less. The obtained sintered body was ground and polished, to thereby obtain an optical element having a thickness of 1 mm as shown in the FIGURE.

Table 1 shows the measurement results of the refractive index and the Abbe number of the obtained optical element. Incidentally, the Abbe number is a value which represents the dispersibility. Each optical element had optical properties of high refractive index and low dispersibility. Furthermore, when the surface thereof was observed with an optical microscope, detachment of surface particles or a flaw on the surface caused in the polishing step was absent, and hence, the satisfactory optical element was obtained.

(Measurement Method)

(1) Refractive Index

The refractive index is represented by a value (nd) determined by measuring a refractive index at a wavelength of 587 nm using a Pulfrich refractometer (trade name "KPR-2000"; manufactured by Shimadzu Device Corporation).

(2) Abbe Number

The Abbe number vd is represented by a value determined by measuring refractive indices nd, nF, and nC at wavelengths of 587 nm, 486 nm, and 656 nm using a Pulfrich refractometer, and then performing calculation using the equation: $vd=(nd-1)/(nF-nC)$.

TABLE 1

| | Sample | | | |
|---|---|---|---|---|
| | No. 1 | No. 2 | No. 3 | No. 4 |
| Ceramic particles | $LaAlO_3$ | $La_{0.5}Gd_{0.5}AlO_3$ | $GdAlO_3$ | $Yb_3Al_5O_{12}$ |
| Refractive index | 2.06 | 2.03 | 2.02 | 2.00 |
| Abbe number | 56 | 52 | 50 | 48 |
| Sintering temperature | 1,200° C. | 1,150° C. | 1,100° C. | 1,350° C. |

| | Sample | | |
|---|---|---|---|
| | No 5 | No. 6 | No. 7 |
| Ceramic particles | $Lu_3Al_5O_{12}$ | $La_3Al_5O_{12}$ | $La_{10}Al_4O_{21}$ |
| Refractive index | 1.94 | 1.85 | 2.08 |
| Abbe number | 65 | 58 | 54 |
| Sintering temperature | 1,150° C. | 1,250° C. | 1,200° C. |

EXAMPLE 2

$La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed ceramic particles having the compounds shown in Sample Nos. 1 to 9 in Table 1, and the oxide raw materials were mixed.

The raw materials were introduced into thermal plasma, and were heated and melted, followed by cooling, by a thermal plasma method for obtaining fine particles, and as a result, spherical particles having an average particle diameter of 3 μm were obtained. At that time, the heating temperature was set at 1,500° C. or higher and 3,000° C. or lower. When the heating temperature was lower than 1,500° C., the melting was not performed sufficiently and the spherical particles were not obtained. When the heating temperature exceeded 3,000° C., the volatilization of the raw materials occurred, and there were obtained only the particles in spherical shape each having a small particle diameter.

The spherical particles were sintered by dry molding under a vacuum in the same manner as in Example 1, and the obtained sintered body was ground and polished, to thereby obtain a sample having a thickness of 1 mm.

The refractive index and the Abbe number of the obtained optical element were optically measured. The results were the same as those shown in Table 1, and the optical element had optical properties of a high refractive index and a low dispersibility. Furthermore, when the surface thereof was observed with an optical microscope, detachment of surface particles or a flaw on the surface caused in the polishing step was absent, and hence, the satisfactory optical element was obtained.

EXAMPLE 3

$La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed ceramic particles having the compounds shown in Sample Nos. 1 to 9 in Table 1, and the oxide raw materials were mixed.

The raw materials were introduced into thermal plasma, and were heated and melted, followed by cooling, by a thermal plasma method for obtaining fine particles, and as a result, spherical particles having an average particle diameter of 10 μm were obtained. At that time, the heating temperature was set at 1,500° C. or higher and 3,000° C. or lower. When the heating temperature was lower than 1,500° C., the melting was not performed sufficiently and the spherical particles were not obtained. When the heating temperature exceeded 3,000° C., the volatilization of the raw materials occurred, and there were obtained only the particles in spherical shape each having a small particle diameter.

The spherical particles were sintered by dry molding under a vacuum in the same manner as in Example 1, and the obtained sintered body was ground and polished, to thereby obtain a sample having a thickness of 1 mm.

The refractive index and the Abbe number of the obtained optical element were optically measured. The results were the same as those shown in Table 1, and the optical element had optical properties of a high refractive index and a low dispersibility. Furthermore, when the surface thereof was observed with an optical microscope, detachment of surface particles or a flaw on the surface caused in the polishing step was absent, and hence, the satisfactory optical element was obtained.

COMPARATIVE EXAMPLE 1

$La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed the compounds shown in Sample Nos. 1 to 8 in Table 1, and the oxide raw materials were mixed.

The raw materials were introduced into thermal plasma, and were heated and melted, followed by cooling, by a thermal plasma method for obtaining fine particles, and as a result, spherical particles having an average particle diameter of 0.1 μm were obtained. At that time, the heating temperature was set at 3,500° C. or higher.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at a temperature range of 1,100° C. or higher and 1,500° C. or lower shown in the table below under a vacuum of $10^{-1}$ Pa or lower. Incidentally, the time taken for sintering was set to 6 hours or more and 24 hours or less. The obtained sintered body was ground and polished, to thereby obtain a sample having a thickness of 1 mm.

When the obtained optical element was observed with an optical microscope, there were a large number of bubbles formed in the element, and hence, the obtained optical element was unsuitable to be used as an optical element.

COMPARATIVE EXAMPLE 2

$La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed the compounds shown in Sample Nos. 1 to 7 in Table 1, and the oxide raw materials were mixed.

The raw materials were introduced into thermal plasma, and were heated and melted, followed by cooling, by a thermal plasma method for obtaining fine particles, and as a result, spherical particles having an average particle diameter of 100 μm were obtained. At that time, the heating temperature was set at 1,500° C. or higher and 3,200° C. or lower.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at a temperature range of 1,100° C. or higher and 1,500° C. or lower shown in the table below under a vacuum of $10^{-1}$ Pa or lower. Incidentally, the time taken for sintering was set to 6 hours or more and 24 hours or less. The obtained sintered body was ground and polished, to thereby obtain a sample having a thickness of 1 mm.

When the obtained optical element was observed with an optical microscope, there were a large number of detachments of surface particles and flaws on the surface caused in the polishing step, and hence, the obtained optical element was unsuitable to be used as an optical element.

(Second Embodiment)

An optical element according to Example 2 of the present invention is formed by vacuum-sintering a molded body of particles each having a two-layer structure, the particles being formed by coating surfaces of ceramic particles having an average particle diameter of 1 μm or more and 10 μm or less and including $Ln_xAl_yO_{[x+y]\times 1.5}$ (Ln represents a rare-earth element, x represents $1 \leq x \leq 10$, and y represents $1 \leq y \leq 5$) with a coating layer including a ceramic having a lower sintering temperature than a sintering temperature of the ceramic particles.

The optical element according to Example 2 of the present invention has a feature in that there are used the particles each having a two-layer structure formed by coating the surfaces of ceramic particles with a layer formed of a ceramic having a lower sintering temperature than a sintering temperature of the ceramic particles. The ceramic particles used here are the same as the ceramic particles used for the first optical element.

It is preferred that the ceramic having a lower sintering temperature than a sintering temperature of the ceramic particles be crystal or glass.

Furthermore, it is preferred that the particles having the two-layer structure have spherical shapes. Furthermore, it is preferred that the coating layer which coats the layer formed of a ceramic having a lower sintering temperature than the sintering temperature of the ceramic particles have a thickness of 0.1 μm or more and 1 μm or less. Furthermore, as a method of forming the coating layer on the surface of the ceramic particles, a plasma melting method is employed.

A method of producing the optical element of the present invention is as follows. First, spherical ceramic particles having an average particle diameter of 1 μm or more and 10 μm or less are prepared by a method such as plasma melting. Next, the spherical ceramic particles are subjected to casting, dry molding, or wet molding to thereby prepare a preliminary molded body.

Next, particles each having a two-layer structure and a spherical shape, in which the surfaces of the spherical ceramic particles having an average particle diameter of 1 μm or more and 10 μm or less is coated with a coating layer, are prepared by a method such as plasma melting. Still further, the particles each having a two-layer structure are subjected to casting, dry molding, or wet molding to thereby prepare a preliminary molded body.

Finally, the preliminary molded body is sintered under a vacuum, followed by grinding and polishing steps, and as a result, an optical element such as an optical lens is obtained. Incidentally, the vacuum-sintering method used here is the same as the vacuum-sintering method used for the first optical element.

EXAMPLE 4

$Y_2O_3$, $La_2O_3$, $Gd_2O_3$, $Yb_2O_3$, $Lu_2O_3$, and $Al_2O_3$ which were oxide raw materials each having a purity of 99.9% were prepared. The raw materials were each adjusted to have a proportion in such a manner that there can be formed ceramic particles having the compounds shown in Sample Nos. 11 to 19 in Table 2, and the oxide raw materials were mixed.

The raw materials were introduced into a central part of thermal plasma, and a 1:1 mixture of $Gd_2O_3$ and $Al_2O_3$ was introduced into a peripheral part thereof, and simultaneously, they were heated and melted, followed by cooling, by a thermal plasma method for obtaining fine particles, to thereby obtain spherical particles having an average particle diameter of 1 μm and an average thickness of $GdAlO_3$ as a coating layer of 0.1 μm. At that time, the heating temperature was set to 1,500° C. or higher and 3,200° C. or lower. When the heating temperature was lower than 1,500° C., the melting was not performed sufficiently and the spherical particles were not obtained. When the heating temperature exceeded 3,200° C., the volatilization of the raw materials occurred, and there were obtained only the particles in spherical shape each having a small particle diameter.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at 1,100° C. under a vacuum of $10^{-1}$ Pa or lower. Incidentally, the sintering temperature was 1,100° C. and the time taken for sintering was set to 6 hours or more and 24 hours or less. The obtained sintered body was ground and polished, to thereby obtain an optical element having a thickness of 1 mm.

Table 2 shows the measurement results of the refractive index and the Abbe number of the obtained optical element. Each optical element had optical properties of a high refractive index and a low dispersibility. Furthermore, when the surface thereof was observed with an optical microscope, detachment of surface particles or a flaw on the surface caused in the polishing step was absent, and hence, the satisfactory optical element was obtained.

As shown in Table 2, when $GdAlO_3$ having a sintering temperature of 1,100° C. was provided as a coating layer on the periphery of each of the ceramic particles of $LaAlO_3$, $La_{0.5}Gd_{0.5}AlO_3$, $Yb_3Al_5O_{12}$, $Lu_3Al_5O_{12}$, $La_3Al_5O_{12}$, $Y_4Al_2O_9$, and $La_{10}Al_4O_{21}$, each having a sintering temperature of 1,150° C. to 1,500° C., the sintering temperature of each of the two-layered particles could be lowered to 1,100° C.

TABLE 2

|  | Sample | | | | |
| --- | --- | --- | --- | --- | --- |
|  | No. 11 | No. 12 | No. 13 | No. 14 | No. 15 |
| Ceramic particles | $Y_3Al_5O_{12}$ | $LaAlO_3$ | $La_{0.5}Gd_{0.5}AlO_3$ | $GdAlO_3$ | $Yb_3Al_5O_{12}$ |
| Coating layer | $GdAlO_3$ | $GdAlO_3$ | $GdAlO_3$ | $GdAlO_3$ | $GdAlO_3$ |
| Refractive index | 1.83 | 2.06 | 2.03 | 2.02 | 2.00 |
| Abbe number | 56 | 56 | 52 | 50 | 48 |
| Sintering temperature | 1,500° C. | 1,200° C. | 1,150° C. | 1,100° C. | 1,350° C. |

|  | Sample | | | |
| --- | --- | --- | --- | --- |
|  | No. 16 | No. 17 | No. 18 | No. 19 |
| Ceramic particles | $Lu_3Al_5O_{12}$ | $La_3Al_5O_{12}$ | $Y_4Al_2O_9$ | $La_{10}Al_4O_{21}$ |
| Coating layer | $GdAlO_3$ | $GdAlO_3$ | $GdAlO_3$ | $GdAlO_3$ |
| Refractive index | 1.94 | 1.85 | 1.93 | 2.08 |
| Abbe number | 65 | 58 | 54 | 54 |
| Sintering temperature | 1,150° C. | 1,250° C. | 1,500° C. | 1,200° C. |

The sintering temperatures of the samples shown in the above table are all 1,100° C.

EXAMPLE 5

$Y_2O_3$, $La_2O_3$, $Gd_2O_3$, $Yb_2O_3$, $Lu_2O_3$, and $Al_2O_3$ which were oxide raw materials each having a purity of 99.9% were prepared. The raw materials were each adjusted to have a proportion in such a manner that there can be formed ceramic particles having the compounds shown in Sample Nos. 11 to 19 in Table 2, and the oxide raw materials were mixed.

The raw materials were introduced into a central part of thermal plasma, and a 1:1 mixture of $Gd_2O_3$ and $Al_2O_3$ was introduced into a peripheral part thereof, and simultaneously, they were heated and melted, followed by cooling, by a thermal plasma method for obtaining fine particles, to thereby obtain spherical particles having an average particle diameter of 3 μm and an average thickness of $GdAlO_3$ as a coating layer of 0.3 μm. At that time, the heating temperature was set to 1,500° C. or higher and 3,000° C. or lower. When the heating temperature was lower than 1,500° C., the melting was not performed sufficiently and the spherical particles were not obtained. When the heating temperature exceeded 3,000° C., the volatilization of the raw materials occurred, and there were obtained only the particles in spherical shapes each having a small particle diameter.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at 1,100° C. under a vacuum of $10^{-1}$ Pa or lower. Incidentally, the time taken for sintering was set to 6 hours or more and 24 hours or less. The obtained sintered body was ground and polished, to thereby obtain an optical element having a thickness of 1 mm.

The refractive index and the Abbe number of the obtained optical element were optically measured, and, in the same manner as the results shown in Table 2, the optical element had optical properties of a high refractive index and a low dispersibility. Furthermore, when the surface thereof was observed with an optical microscope, detachment of surface particles or a flaw on the surface caused in the polishing step was absent, and hence, the satisfactory optical element was obtained.

When $GdAlO_3$ having a sintering temperature of 1,100° C. was provided as a coating layer on the periphery of each of $Y_3Al_5O_{12}$, $LaAlO_3$, $La_{0.5}Gd_{0.5}AlO_3$, $Yb_3Al_5O_{12}$, $Lu_3Al_5O_{12}$, $La_3Al_5O_{12}$, $Y_4Al_2O_9$, and $La_{10}Al_4O_{21}$, each having a sintering temperature of 1,150° C. to 1,500° C., the sintering temperature of each of the two-layered particles could be lowered to 1,100° C.

EXAMPLE 6

$Y_2O_3$, $La_2O_3$, $Gd_2O_3$, $Yb_2O_3$, $Lu_2O_3$, and $Al_2O_3$ which were oxide raw materials each having a purity of 99.9% were prepared. The raw materials were each adjusted to have a proportion in such a manner that there can be formed ceramic particles having the compounds shown in Sample Nos. 11 to 19 in Table 2, and the oxide raw materials were mixed.

The raw materials were introduced into a central part of thermal plasma, and a 1:1 mixture of $Gd_2O_3$ and $Al_2O_3$ was introduced into a peripheral part thereof, and simultaneously, they were heated and melted, followed by cooling, by a thermal plasma method for obtaining fine particles, to thereby obtain spherical particles having an average particle diameter of 10 μm and an average thickness of $GdAlO_3$ as a coating layer of 1 μm. At that time, the heating temperature was set to 1,500° C. or higher and 3,000° C. or lower. When the heating temperature was lower than 1,500° C., the melting was not performed sufficiently and the spherical particles were not obtained. When the heating temperature exceeded 3,000° C., the volatilization of the raw materials occurred, and there were obtained only the particles in spherical shapes each having a small particle diameter.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at 1,100° C. under a vacuum of $10^{-1}$ Pa or lower. Incidentally, the time taken for sintering was set to 6 hours or more and 24 hours or less. The obtained sintered body was ground and polished, to thereby obtain an optical element having a thickness of 1 mm.

The refractive index and the Abbe number of the obtained optical element were optically measured, and, in the same manner as the results shown in Table 2, the optical element had optical properties of a high refractive index and a low dispersibility. Furthermore, when the surface thereof was observed with an optical microscope, detachment of surface particles or a flaw on the surface caused in the polishing process was absent, and hence, the satisfactory optical element was obtained.

When $GdAlO_3$ having a sintering temperature of 1,100° C. was provided as a coating layer on the periphery of each of $Y_3Al_5O_{12}$, $LaAlO_3$, $La_{0.5}Gd_{0.5}AlO_3$, $Yb_3Al_5O_{12}$, $Lu_3Al_5O_{12}$, $La_3Al_5O_{12}$, $Y_4Al_2O_9$, and $La_{10}Al_4O_{21}$, each having a sintering temperature of 1,150° C. to 1,500° C., the sintering temperature of each of the two-layered particles could be lowered to 1,100° C.

EXAMPLE 7

$Y_2O_3$, $La_2O_3$, $Gd_2O_3$, $Yb_2O_3$, $Lu_2O_3$, and $Al_2O_3$ which were oxide raw materials each having a purity of 99.9% were prepared. The raw materials were each adjusted to have a proportion in such a manner that there can be formed ceramic particles having the compounds shown in Sample Nos. 11 to 19 in Table 2, and the oxide raw materials were mixed.

Furthermore, a glass having a composition as shown in Table 3 and properties as shown in Table 4 was prepared as a coating layer. The raw materials were introduced into a central part of thermal plasma, and the glass having the composition as shown in Table 3 and the properties as shown in Table 4 was introduced into a peripheral part, and simultaneously, they were heated and melted, followed by cooling, by a thermal plasma method for obtaining fine particles, to thereby obtain spherical particles having an average particle diameter of 10 μm and an average thickness of the glass as a coating layer of 1 μm. At that time, the heating temperature was set to 1,500° C. or higher and 3,000° C. or lower. When the heating temperature was lower than 1,500° C., the melting was not performed sufficiently and the spherical particles were not obtained. When the heating temperature exceeded 3,000° C., the volatilization of the raw materials occurred, and there were obtained only the particles in spherical shape each having a small particle diameter.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 5 mm was obtained.

The preliminary molded body was sintered at a temperature of 750° C. or higher under a vacuum of $10^{-1}$ Pa or lower. The time taken for sintering was set to 1 hour or more and 4 hours or less. The obtained sintered body was ground and polished, to thereby obtain a sample having a thickness of 3 mm.

The refractive index and the Abbe number of the obtained optical element were optically measured, and, in the same manner as the results shown in Table 2, the optical element had optical properties of a high refractive index and a low dispersibility. Furthermore, when the surface thereof was observed with an optical microscope, detachment of surface particles or a flaw on the surface caused in the polishing step was absent, and hence, the satisfactory optical element was obtained.

When the glass having a glass transition temperature of 600° C. was provided as a coating layer on the periphery of the ceramic having a high sintering temperature, the sintering temperature of each of the two-layered particles could be lowered to 750° C.

TABLE 3

| Glass composition (weight %) | | | | | | | | | | |
|---|---|---|---|---|---|---|---|---|---|---|
| $B_2O_3$ | $Ga_2O_3$ | $Gd_2O_3$ | $La_2O_3$ | $Li_2O$ | $Nb_2O_5$ | $WO_3$ | $SiO_2$ | $Ta_2O_5$ | $ZnO$ | $ZrO_2$ |
| 15.0 | 6.0 | 7.0 | 35.0 | 1.0 | 2.0 | 1.5 | 5.0 | 17.0 | 5.0 | 5.5 |

TABLE 4

| Refractive index | Abbe number | Glass transition point |
|---|---|---|
| 1.843 | 40.7 | 600 |

COMPARATIVE EXAMPLE 3

$Y_2O_3$, $La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed ceramic particles having the compounds shown in Sample Nos. 11 to 19 in Table 2, and the oxide raw materials were mixed.

The raw materials were introduced into a central part of thermal plasma, and a 1:1 mixture of $Gd_2O_3$ and $Al_2O_3$ was introduced into a peripheral part, and simultaneously, they were heated and melted, followed by cooling, by a thermal plasma method for obtaining fine particles, to thereby obtain spherical particles having an average particle diameter of 0.1 μm and an average thickness of $GdAlO_3$ as a coating layer of 0.01 μm. At that time, the heating temperature was set to 3,500° C. or higher.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 2 mm was obtained. The preliminary molded body was sintered at a temperature ranging from 1,100° C. or higher to 1,500° C. or lower shown in the table below under a vacuum of $10^{-1}$ Pa or lower. Incidentally, the time taken for sintering was set to 6 hours or more and 24 hours or less. The obtained sintered body was ground and polished, to thereby obtain a sample having a thickness of 1 mm.

When the obtained optical element was observed with an optical microscope, there were a large number of bubbles formed in the element, and hence, the obtained optical element was unsuitable to be used as an optical element.

COMPARATIVE EXAMPLE 4

$Y_2O_3$, $La_2O_3$, $Gd_2O_3$, $Yb_2O_3$, $Lu_2O_3$, and $Al_2O_3$ which were oxide raw materials each having a purity of 99.9% or more were prepared. The raw materials were each adjusted to have a proportion in such a manner that there can be formed ceramic particles having the compounds shown in Sample Nos. 11 to 19 in Table 2, and the oxide raw materials were mixed.

The raw materials were introduced into a central part of thermal plasma, and the glass having the composition as shown in Table 3 and the properties as shown in Table 4 was introduced into a peripheral part, and simultaneously, they were heated and melted, followed by cooling, by a thermal plasma method for obtaining fine particles, to thereby obtain spherical particles having an average particle diameter of 100 μm and an average thickness of the glass as a coating layer of 10 μm.

The spherical particles were subjected to dry molding under a pressure of 9,800,000 Pa (100 kgf) to 196,000,000 Pa (2,000 kgf), and as a result, a preliminary molded body having a diameter of 20 mm and a thickness of 5 mm was obtained.

The preliminary molded body was sintered at a temperature of 750° C. or higher under a vacuum of $10^{-1}$ Pa or lower. The time taken for sintering was set to 1 hour or more and 4 hours or less. The obtained sintered body was ground and polished, to thereby obtain a sample having a thickness of 3 mm.

The surface of the obtained optical element was observed with an optical microscope, there were a large number of detachments of surface particles and flaws on the surface caused in the polishing step, and hence, the obtained optical element was unsuitable to be used as an optical element.

In the present invention, although the optical physical properties of the central part are different from the optical physical properties of the coating layer, the thickness of the coating layer was one tenth of the diameter of the particle and the cross-sectional area ratio was 1:100, and hence, the optical physical properties of the obtained optical element were approximately equal to those of the central ceramic.

The present invention is not limited to the above examples. For instance, as raw materials, there may be used a composite oxide such as $La_3Al_5O_{12}$, and besides oxides, there may be also used carbonates and nitrates. The production of the preliminary molded body can be also performed by casting or wet molding. In the production, a small amount of an organic binder may be added thereto.

As the rare-earth elements to be used, in addition to Y, La, Gd, Yb, and Lu, there can also be used Ce, Pr, Nd, Pm, Sm, Eu, Gd, Tb, Dy, Ho, Er, and Tm.

Furthermore, in place of the two-stage processes of dry molding and vacuum heating, hot isostatic pressing (HIP) can be performed to thereby shorten the time taken for heating to 3 to 24 hours.

A preliminary molded body and a sintered body each having a diameter of 20 mm or more and a thickness of 2 mm or more can be also produced. Furthermore, there could be produced a preliminary molded body and a sintered body each having a size of a diameter of 20 mm or more and a thickness of 5 mm or more. In addition, as a coating layer, there can be also used glass having a composition other than that of the examples of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-255080, filed Sep. 30, 2008, which is hereby incorporated by reference herein in its entirety.

What is claimed is:
1. An optical element forming process comprising:
   vacuum-sintering a molded body comprising a plurality of ceramic particles, wherein the ceramic particles each comprise $Ln_xAl_yO_{[x+y]\times1.5}$, where Ln represents a rare-earth element, $1 \leq x \leq 10$, and $1 \leq y \leq 5$, and the ceramic particles have an average particle diameter, before sintering, of 1 μm or more and 10 μm or less, and
wherein Ln comprises at least one selected from La, Gd, Yb and Lu.

2. The optical element forming process according to claim 1, wherein an optical element formed by the optical element forming process has a refractive index of 1.85 or more and 2.06 or less, and an Abbe number of 48 or more and 65 or less.

* * * * *